(12) United States Patent
Hwang et al.

(10) Patent No.: US 10,286,560 B1
(45) Date of Patent: May 14, 2019

(54) SHAPE COMPLIANT GRIPPER

(71) Applicants: DAWOO FA Co., LTD, Cheonan-si, Chungcheongnam-do (KR); Korea University Of Technology And Education Industry-University Cooperation Foundation, Cheonan-si, Chungcheonnam-do (KR); KOREA NATIONAL UNIVERSITY OF TRANSPORTATION Industry-Academic Cooperation Foundation, Chungju-si, Chungcheongbuk-do (KR)

(72) Inventors: Hae Sook Hwang, Daejeon (KR); Kyoung Bok Jin, Suwon-si (KR); Sang Youn Kim, Seoul (KR); Tae Heon Yang, Chungju-si (KR)

(73) Assignees: Dawoo Fa Co., Ltd, Cheonan-Si, Chungcheongnam-Do (KR); Korea University Of Technology And Education Industry—University Cooperation Foundation, Cheonan-Si, Chungcheongnam-Do (KR); Korea National University Of Transportation Industry—Academic Cooperation Foundation, Chungju-Si, Chungcheongbuk-Do (KR)

(*) Notice: Subject to any disclaimer, the term of this patent is extended or adjusted under 35 U.S.C. 154(b) by 0 days.

(21) Appl. No.: 16/101,665

(22) Filed: Aug. 13, 2018

(30) Foreign Application Priority Data

Jun. 22, 2018 (KR) .................. 10-2018-0072359

(51) Int. Cl.
*B25J 9/14* (2006.01)
*B25J 15/00* (2006.01)
*B25J 15/06* (2006.01)

(52) U.S. Cl.
CPC .......... *B25J 15/0033* (2013.01); *B25J 9/14* (2013.01); *B25J 15/0608* (2013.01)

(58) Field of Classification Search
CPC ....... A61F 2/586; A61F 2/588; B25J 15/0023; B25J 15/08; B25J 15/0009; B25J 15/0246; B25J 9/1633; B25J 13/082; B25J 15/0033; B25J 15/0608; B25J 9/14; A61B 17/29; A61B 2017/2932; A61B 2017/00398;
(Continued)

(56) References Cited

U.S. PATENT DOCUMENTS 6,400,549 B1 * 6/2002 Davis, III .............. B25J 7/00
361/144
8,548,626 B2 * 10/2013 Steltz .................. B25J 15/0023
294/192
(Continued)

*Primary Examiner* — Stephen A Vu
(74) *Attorney, Agent, or Firm* — Dinsmore & Shohl LLP; Yongsok Choi, Esq.

(57) ABSTRACT

A shape compliant gripper with which an atypical object having various shapes, sizes and materials can be picked. The shape compliant gripper comprises a body and a shape compliant module disposed on the body and having rigidity capable of being variably controlled. Further, the shape compliant module comprises a magnetorheological elastomer, a magnet part, and a control part for controlling a position of the magnet part with respect to the magnetorheological elastomer.

9 Claims, 13 Drawing Sheets

(58) Field of Classification Search
CPC . A61B 2017/00876; A61B 2562/0247; A61M 2205/0288; H01F 7/204
See application file for complete search history.

(56) References Cited

U.S. PATENT DOCUMENTS

| | | | | |
|---|---|---|---|---|
| 8,882,165 | B2* | 11/2014 | Lipson | B25J 15/0023 |
| | | | | 294/188 |
| 9,579,219 | B2* | 2/2017 | Amend, Jr. | B25J 15/08 |
| 2009/0242719 | A1* | 10/2009 | Carnevali | F16B 47/00 |
| | | | | 248/346.2 |
| 2011/0071670 | A1* | 3/2011 | Mankame | B25J 9/1085 |
| | | | | 700/245 |
| 2013/0033050 | A1* | 2/2013 | Matsuoka | B25J 15/0023 |
| | | | | 294/86.4 |

* cited by examiner

SHAPE COMPLIANT GRIPPER

CROSS-REFERENCE TO RELATED APPLICATION

This application claims priority to and the benefit of Korean Patent Application No. 10-2018-0072359, filed on Jun. 22, 2018, the entire contents of which are herein incorporated by reference.

FIELD OF THE INVENTION

The present disclosure relates to a shape compliant gripper, and more particularly, to a shape compliant gripper for picking an atypical object of various shapes, sizes, and materials.

BACKGROUND

Robots are widely used to perform various tasks such as welding, assembling, painting, and the like in industrial manufacturing sites. Further, robot utilization fields are gradually expanding across all industrial and service fields including a personal service field providing services in surroundings of a human life and a professional service field providing specialized services such as medical care and the like.

Particularly, in recent years, with the rapid growth in a logistics market, it has become very important to increase a processing speed through automation of logistics, and in order to meet such a need, development of a picking robot for picking up cargo and a transfer robot for transferring cargo is actively underway.

In the picking robot among such robots, a gripper is necessarily required to pick up atypical objects, i.e., objects of various shapes, sizes, and materials, in order to implement automation of logistics.

The gripper includes a mechanical gripper capable of mechanically picking up an object by having a plurality of fingers driven by a hydraulic pressure or a pneumatic pressure, and a vacuum gripper capable of picking up an object by generating a vacuum on an interface between the vacuum gripper and the object. Further, known is an electroadhesive gripper for picking up an object using an electrostatic force generated when current flows through a conductor.

However, the mechanical gripper and the vacuum gripper have limitations in picking up objects of various sizes and shapes without damage with an appropriate pressure, and thus the mechanical gripper and the vacuum gripper are not effective for picking up atypical objects, and in order to pick up a heavy object, a conventional electroadhesive gripper should have a large contact area and a large voltage should be applied to the conventional electroadhesive gripper, so that the conventional electroadhesive gripper has a limitation in picking up the atypical objects.

Therefore, it is still required to develop a gripper capable of picking up atypical objects.

SUMMARY OF THE INVENTION

The present disclosure is directed to providing a shape compliant gripper capable of picking up an atypical object with a simplified structure and an easy mechanism while overcoming a limitation of the conventional gripper.

One aspect of the present disclosure provides a shape compliant gripper for picking up an atypical object, the gripper comprising: a body; and a shape compliant module disposed on the body and having rigidity capable of being variably controlled, wherein the shape compliant module comprises a magnetorheological elastomer, a magnet part, and a control part for controlling a position of the magnet part with respect to the magnetorheological elastomer.

According to one embodiment, when the magnet part is spaced apart from the magnetorheological elastomer due to the control part, the magnetorheological elastomer may have low rigidity so that the shape of the magnetorheological elastomer can be deformed according to a shape of an external object, and when the magnet part is disposed adjacent to the magnetorheological elastomer due to the control part, rigidity of the magnetorheological elastomer may be increased so that the shape of the magnetorheological elastomer can be maintained.

According to one embodiment, the control part may control a distance between the magnet part and the magnetorheological elastomer using an air pressure.

According to one embodiment, the control part may comprise at least one port connected to an inside of the shape compliant module and may control a distance between the magnet part and the magnetorheological elastomer by controlling pressure inside the shape compliant module through the at least one port.

According to one embodiment, the control part may comprise bellows formed between the magnetorheological elastomer and the magnet part and at least one port connected to an inside of the bellows, and may control a distance between the magnet part and the magnetorheological elastomer by controlling pressure inside the bellows through the at least one port.

According to one embodiment, the magnet part may comprise a plurality of permanent magnets, and the control part may comprise at least one tube disposed between the plurality of adjacent permanent magnets and at least one port connected to an inside of the at least one tube and may control a distance between the magnet part and the magnetorheological elastomer by controlling pressure inside the tube through the at least one port.

According to one embodiment, the shape compliant module may further comprise a spring disposed between the magnet part and the body, and when the magnet part returns to its original position in a state in which the magnet part is moved by the control part, a returning speed of the magnet part may be improved due to elasticity of the spring.

According to one embodiment, the magnet part may comprise a housing and a plurality of permanent magnets placed within the housing. The plurality of permanent magnets may be neodymium magnets. Further, the magnet part may further comprise a plurality of electromagnets disposed on one side of the housing.

According to one embodiment, the shape compliant gripper may further comprise an electroadhesive module disposed on the shape compliant module. The electroadhesive module may comprise an insulator and a conductor disposed on the insulator and may be capable of adhering to an external object due to an electrostatic force generated when a voltage is applied to the conductor.

According to one embodiment of the present disclosure, an atypical object of various shapes, sizes, and materials can be picked-up by variably controlling a rigidity of the shape compliant module with a simplified structure and an easy mechanism.

DETAILED DESCRIPTION OF EXEMPLARY EMBODIMENTS

Figure 1:
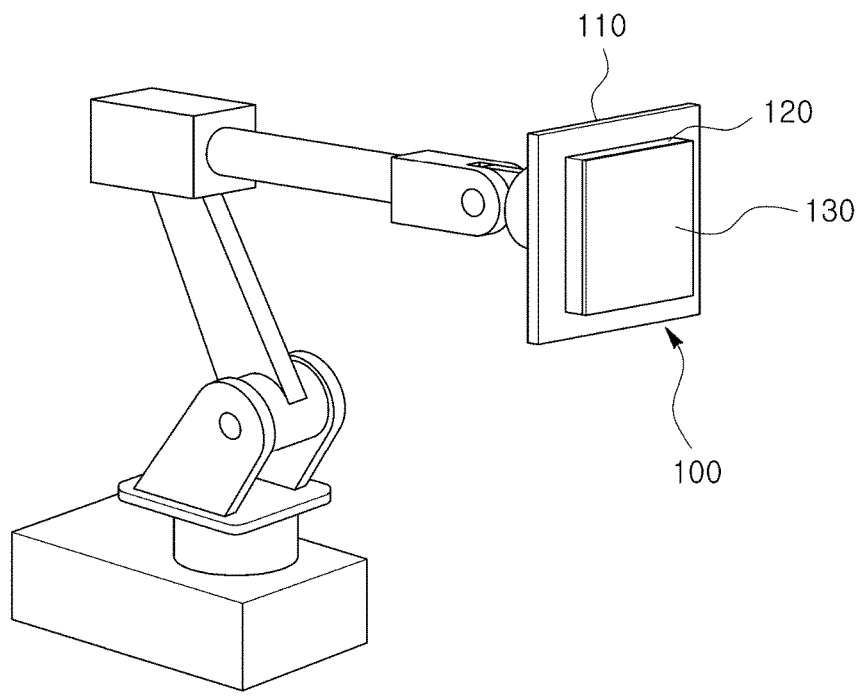
FIG. 1 is a diagram illustrating a robot having a shape compliant gripper according to a first embodiment of the present disclosure.

Hereinafter, preferred embodiments of the present disclosure will be fully described in a detail which is suitable for implementation by those skilled in the art to which the present disclosure pertains with reference to the accompanying drawings.

In order to clearly describe the present disclosure, a description of a portion not related to the present disclosure will be omitted, and throughout this disclosure, like reference numerals will be assigned to like elements.

When one element is herein referred to as being "above" other element, this includes a case in which the one element is located "immediately above" the other element as well as a case in which another element is present between the one element and the other element, and a connection of two elements means that the two elements are connected by being in direct contact with each other as well as these elements are connected through another element.

Further, a size, a thickness, a position, and the like of each element shown in the drawings are arbitrarily illustrated for convenience of description, and thus the present disclosure is not necessarily limited to those shown in the drawings. That is, it should be noted that specific shapes, structures, and features described herein can be changed and implemented from one embodiment to another embodiment without departing from the spirit and scope of the present disclosure, and a position or an arrangement of each element can also be changed without departing from the spirit and scope of the present disclosure.

Accordingly, the following detailed description is not to be taken in a limiting sense, and the scope of the present disclosure should be construed to include the scope of the appended claims and equivalents thereof.

Figure 2:
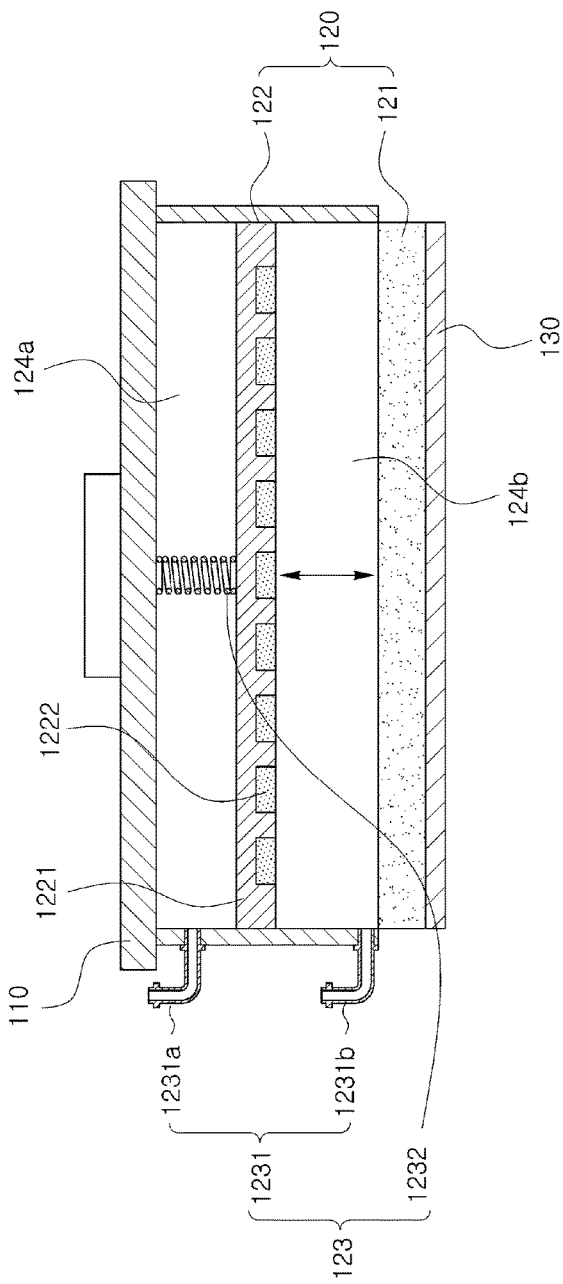
FIG. 2 is a cross-sectional view of the shape compliant gripper according to the first embodiment of the present disclosure.

FIG. 1 is a diagram illustrating a robot having a shape compliant gripper according to a first embodiment of the present disclosure, and FIG. 2 is a cross-sectional view of the shape compliant gripper according to the first embodiment of the present disclosure.

Referring to FIG. 1, a shape compliant gripper 100 according to the first embodiment of the present disclosure is an end effector of a robot and comprises a body 110, a shape compliant module 120, and an electroadhesive module 130.

The body 110 of the shape compliant gripper 100 may be connected to an arm of a robot 10 via an additional connection member and may be moved to a target object through a rotational motion or a translational motion. In the present disclosure, a structure in which the body 110 of the shape compliant gripper 100 is connected to the arm of the robot 10, can be implemented with various known methods. The present disclosure is not characterized by the structure or movement method of the body 110 and thus, a description thereof will be omitted.

In the shape compliant gripper 100 according to the first embodiment of the present disclosure, the shape compliant module 120 is disposed on the body 110. The shape compliant module 120 is a module capable of controlling its rigidity variably. When the shape compliant gripper 100 is in contact with an object so as to pick the object, the shape of the shape compliant gripper 100 is deformed conforming to the shape of the object, and after the shape of the object is deformed, the rigidity of the shape compliant gripper 100 is controlled to be increased so that the deformed shape can be maintained.

To this end, the shape compliant module 120 according to the present embodiment includes a magnetorheological elastomer 121 having rigidity varied by a magnetic field. The magnetorheological elastomer 121 is an elastic body including magnetic particles in a polymer and having a property in which the magnetic particles have directivity to increase rigidity of the magnetorheological elastomer 121 when the magnetic field is applied to the magnetorheological elastomer 121. When the magnetic field is not applied to the magnetorheological elastomer 121, the rigidity of the magnetorheological elastomer 121 is low so that the shape of the magnetorheological elastomer 121 may be varied due to a pressure applied to the magnetorheological elastomer 121 from the outside, and when the magnetic field is applied to the magnetorheological elastomer 121, the rigidity of the magnetorheological elastomer 121 may be increased so that the shape of the magnetorheological elastomer 121 can be maintained.

The shape compliant module 120 according to the present embodiment further includes a magnet part 122 and a control part 123 for controlling the intensity of the magnetic field applied to the magnetorheological elastomer 121. As illustrated in FIG. 2, the magnet part 122 and the control part 123 may be disposed on one side of the magnetorheological elastomer 121, in more detail, on the opposite side on which the electroadhesive module 130 is disposed, and the control part 123 may control the intensity of the magnetic field applied to the magnetorheological elastomer 121 by adjusting a distance between the magnet part 122 and the magnetorheological elastomer 121.

Figure 3:
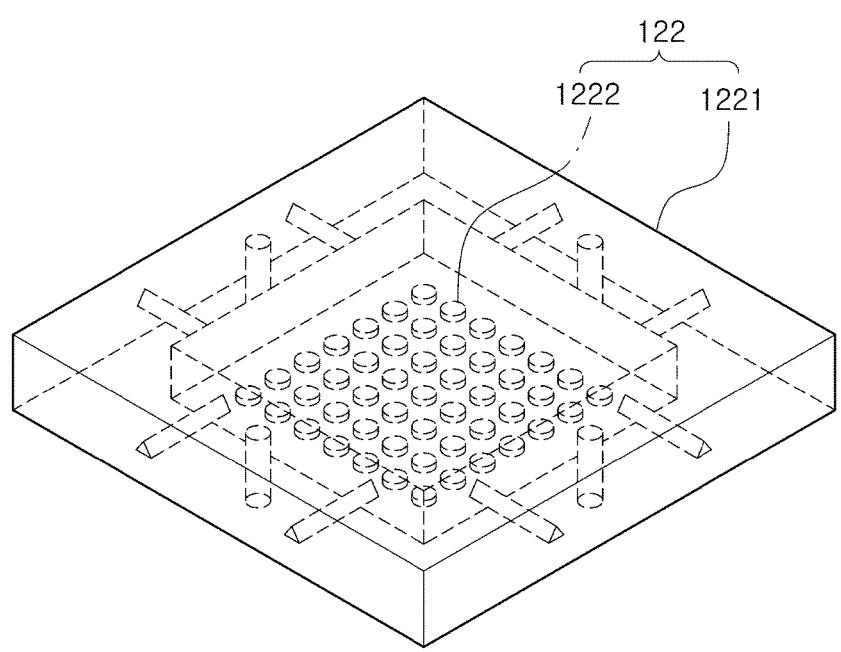
FIG. 3 is a diagram illustrating a magnet part of the shape compliant gripper according to the first embodiment of the present disclosure.

FIG. 3 illustrates a magnet part of the shape compliant module according to the first embodiment of the present disclosure. Referring to FIG. 3, the magnet part 122 may include a housing 1221 and a plurality of permanent magnets 1222. The housing 1221 may be formed of a frame having an approximately rectangular parallelepiped, and the plurality of permanent magnets 1222 may be arranged within the housing 1221 at regular intervals. In the present embodiment, a groove (not shown) for accommodating the permanent magnets 1222 is formed in one surface of the housing 1221, and the plurality of permanent magnets 1222 are inserted into and fixed to the groove of the housing 1221 while being maintained at regular intervals.

In the present embodiment, neodymium (Nd) magnets are used as the permanent magnets 1222 disposed within the housing 1221. The Nd magnet that is one of the strongest permanent magnets, is a magnet made by alloying Nd, boron (B), and iron (Fe) with one another by sintering at a predetermined ratio.

However, in the present disclosure, a detailed configuration of the magnet part 122, for example, a shape of the housing 1221, an arrangement of the permanent magnet 1222, and a material of the permanent magnet 1222, is not limited to the above description and may be modified in various ways. It is sufficient as long as a magnetic field at which a sufficient rigidity is generated in the magnetorheological elastomer 121, is formed when the magnet part 122 is disposed adjacent to the magnetorheological elastomer 121.

As described above, the control part 123 of the shape compliant module 120 according to the first embodiment of the present disclosure performs a function of controlling the position of the magnet part 122 with respect to the magnetorheological elastomer 121 so as to control the intensity of the magnetic field applied to the magnetorheological elastomer 121.

In detail, the control part 123 of the shape compliant module 120 according to the present embodiment controls the position of the magnet part 122 using an air pressure. To this end, the control part 123 includes ports 1231 connected to spaces formed in both sides of the magnet part 122, i.e., a space formed between the magnet part 122 and the magnetorheological elastomer 121 and a space formed between the magnet part 122 and the body 110, respectively, and an air pressure adjusting part (not shown).

The control part 123 may control pressure in both-side spaces by introducing air into the ports 1231 connected to the both-side spaces of the magnet part 122 or discharging the air from the ports 1231 using the air pressure adjusting part, and thus movement of the magnet part 122 can be controlled. For example, when the air is introduced into a first space 124a between the magnet part 122 and the body 110 via the first port 1231a or the air is discharged from the second space 124b between the magnet part 122 and the magnetorheological elastomer 121 via the second port 1231b, pressure in the first space 124a is relatively increased compared to pressure in the second space 124b so that the magnet part 122 is moved to the opposite side to the body 110, i.e., the magnetorheological elastomer 121. On the contrary, when the air is discharged from the first space 124a between the magnet part 122 and the body 110 via the first port 1231a or the air is introduced into the second space 124b between the magnet part 122 and the magnetorheological elastomer 121 via the second port 1231b, the pressure in the second space 124b is relatively increased compared to the pressure in the first space 124a so that the magnet part 122 is moved to the body 110.

The control part 123 of the shape compliant module 120 may further include a spring 1232 disposed between the body 110 and the magnet part 122. One end and the other end of the spring 1232 of the control part 123 may be fixedly connected to the body 110 and the magnet part 122, respectively. Thus, when the magnet part 122 is moved to the magnetorheological elastomer 121 by the air pressure adjusting part, the spring 1232 is elongated. Subsequently, when the magnet part 122 returns to the body 110, due to an elastic restoring force of the spring 1232, returning of the magnet part 122 can be more rapidly performed. Thus, the magnetic field applied to the magnetorheological elastomer 121 can be rapidly removed so that a change of rigidity of the magnetorheological elastomer 121 can be rapidly carried out, and therefore, as will be described later, detachment of the target object from the shape compliant gripper 100 can be rapidly performed.

In the present embodiment, one spring 1232 is disposed in the first space 124a between the magnet part 122 and the body 110. However, a plurality of springs may be disposed in the first space 124a, or a shape compliant module may also be configured without the use of a spring.

The electroadhesive module 130 of the shape compliant gripper 100 according to the first embodiment of the present disclosure is disposed on the shape compliant module 120 and performs a function of being in direct contact with and adhering to an external object. The electroadhesive module 130 includes an insulator and a conductor installed on the insulator. When a voltage is applied to the conductor, the electroadhesive module 130 adheres to the external object using an electrostatic force generated when an opposite polarity is induced to the external object. The insulator of the electroadhesive module 130 may be formed of a material that is flexible and deformable, such as silicone rubber, polyurethane, polydimethylsiloxane (PDMS), polyimide, and the like. The conductor may include a conductive material such as metal, carbon, conductive polymer, and the like. Thus, when the electroadhesive module 130 is in contact with the external object so as to pick the external object using the shape compliant gripper 100, the surface of the insulator is in close contact with the surface of the external object so that a contact area can be increased and an electroadhesive force can be maximized.

FIGS. 4A to 4D are diagrams illustrating states in which an object is picked using the shape compliant gripper according to the first embodiment of the present disclosure. Hereinafter, an operation of the shape compliant gripper 100 according to the present embodiment will be described with reference to FIGS. 4A to 4D.

Figure 4A:
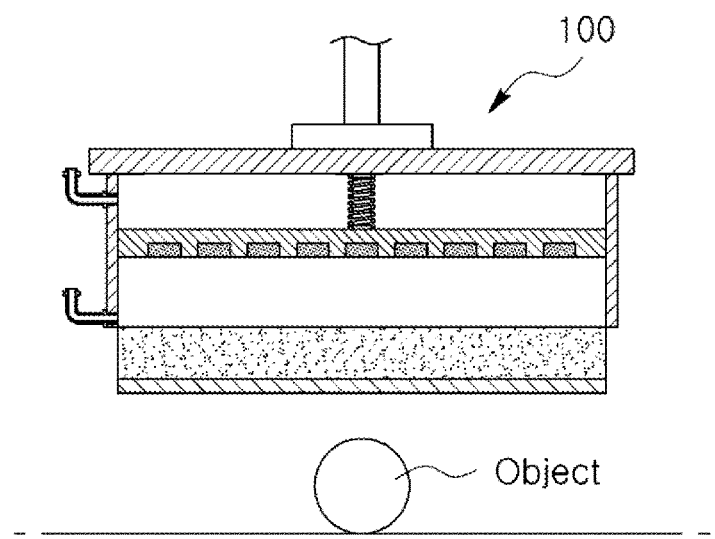
FIG. 4A is a diagram illustrating a state in which an object is picked using the shape compliant gripper according to the first embodiment of the present disclosure.
Figure 4B:
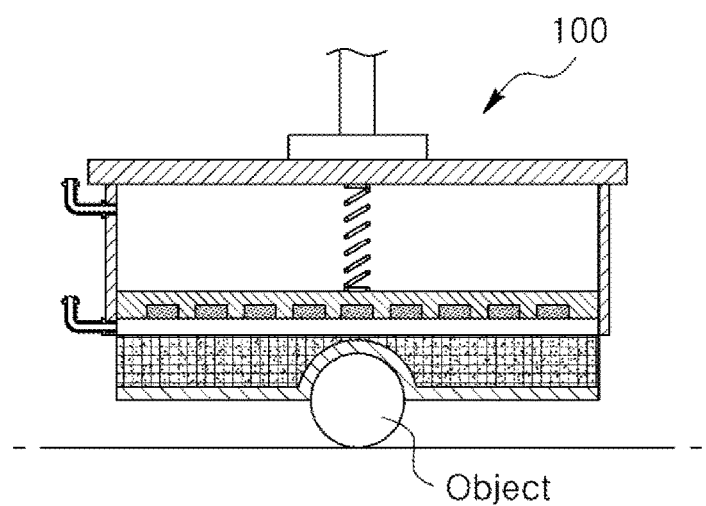
FIG. 4B is a diagram illustrating a state in which an object is picked using the shape compliant gripper according to the first embodiment of the present disclosure.

First, the shape compliant gripper 100 is moved close to a target object (see FIG. 4A).

Subsequently, the shape compliant gripper 100 is made in contact with the surface of the object. In this case, because the magnet part 122 of the shape compliant module 120 is spaced by a predetermined distance apart from the magnetorheological elastomer 121, the intensity of the magnetic field applied to the magnetorheological elastomer 121 is low so that the magnetorheological elastomer 121 has low rigidity. Thus, the shape of the magnetorheological elastomer 121 may be deformed conforming to the shape of the object in contact with the magnetorheological elastomer 121 (see FIG. 4B). Also, because the electroadhesive module 130 is formed of a deformable and flexible material, the shape of the electroadhesive module 130 is also deformed conforming to the shape of the surface of the object.

Figure 4C:
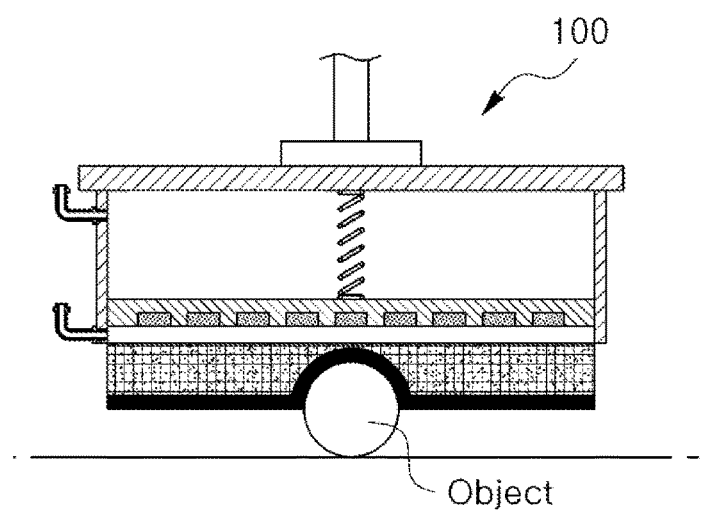
FIG. 4C is a diagram illustrating a state in which an object is picked using the shape compliant gripper according to the first embodiment of the present disclosure.

When the shape of the magnetorheological elastomer 121 is deformed, the air is introduced into the first space 124a via the first port 1231a so that the magnet part 122 is moved to the magnetorheological elastomer 121 and simultaneously, a voltage is applied to the electroadhesive module 130 (see FIG. 4C). Thus, the intensity of the magnetic field applied to the magnetorheological elastomer 121 is increased so that rigidity of the magnetorheological elastomer 121 can be increased and the shape of the deformed surface of the magnetorheological elastomer 121 can be maintained. Furthermore, an electroadhesive force is generated on the surface of the electroadhesive module 130 so that the object is adhered to the shape compliant gripper 100.

Figure 4D:
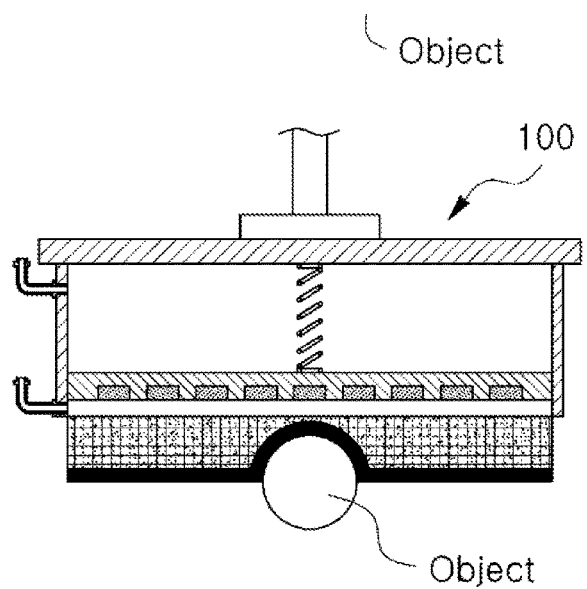
FIG. 4D is a diagram illustrating a state in which an object is picked using the shape compliant gripper according to the first embodiment of the present disclosure.

In this way, when the shape of the contact surface of the shape compliant gripper 100 is deformed conforming to the shape of the object and the object is adhered to the shape compliant gripper 100 by the electroadhesive force, the object can be transferred to a desired position using the body 110 connected to a robot arm (see FIG. 4D).

On the contrary, a procedure in which the shape compliant gripper 100 puts down the object, may be performed in a reverse order of the operations in FIGS. 4A to 4D described above.

In the present embodiment, ports 1231 are connected to both-side spaces of the magnet part 122, i.e., the space between the magnet part 122 and the magnetorheological elastomer 121 and the space between the magnet part 122 and the body 110, respectively. However, the ports 1231 may also be connected to either one side thereof. For example, when ports for air introduction and discharging are connected only to the space between the magnet part 122 and the magnetorheological elastomer 121 and the air is introduced into the space between the magnet part 122 and the magnetorheological elastomer 121 via the ports, the magnet part 122 and the magnetorheological elastomer 121 are spaced apart from each other. On the contrary, when the air is discharged from the space between the magnet part 122 and the magnetorheological elastomer 121 via the ports, the magnet part 122 and the magnetorheological elastomer 121 may also be configured to be adjacent to each other.

The configuration of the shape compliant gripper according to the first embodiment of the present disclosure described above, in particular, the configuration of the shape compliant module may be modified in various shapes. Hereinafter, other embodiments of the present disclosure will be described with reference to FIGS. 5 to 8. In this case, description of the same configuration as that of the first embodiment of the present disclosure will be omitted.

Figure 5:
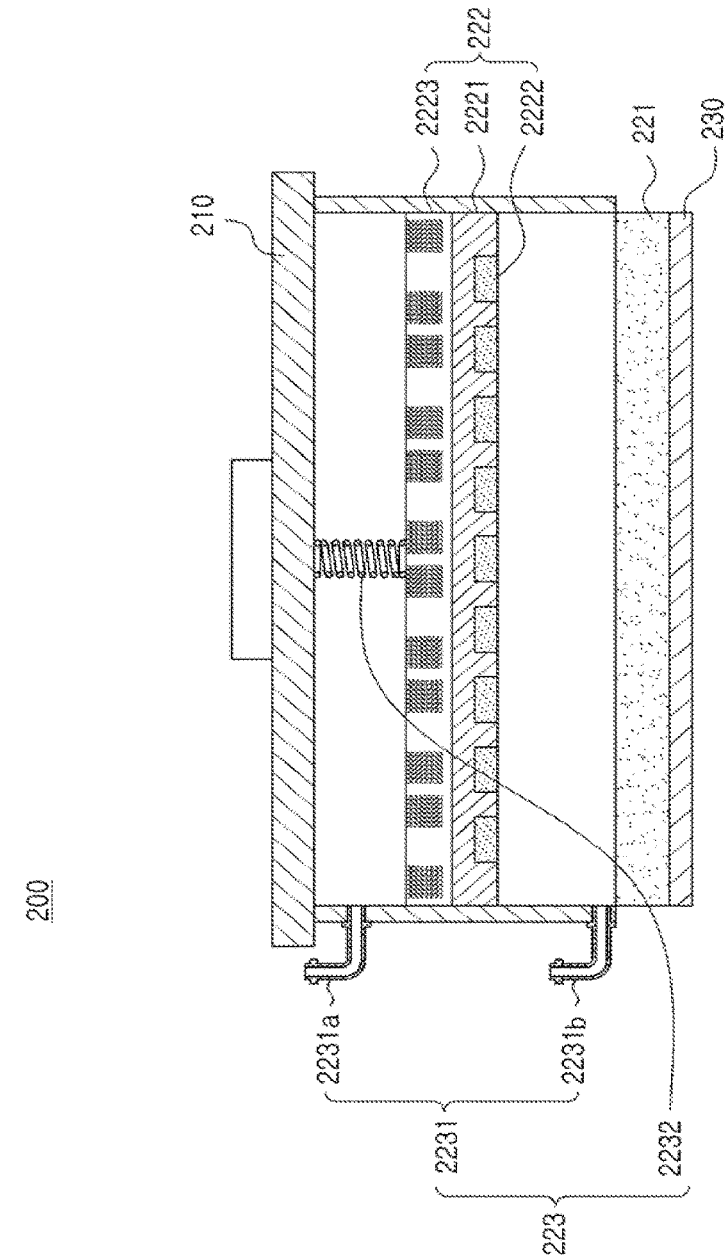
FIG. 5 is a cross-sectional view of a shape compliant gripper according to a second embodiment of the present disclosure.

FIG. 5 is a cross-sectional view of a shape compliant gripper according to a second embodiment of the present disclosure. In the present embodiment, only the configuration of a magnet part 222 of a shape compliant module 220 is changed from the first embodiment of the present disclosure. In detail, the magnet part 222 of the shape compliant module 220 of a shape compliant gripper 200 according to the present embodiment may further include an electromagnet 2223.

The electromagnet 2223 may be fixedly disposed on one side of a housing 2221 of the magnet part 222, in more detail, the opposite side on which permanent magnets 2222 of the magnet part 222 are disposed, i.e., the opposite side to a magnetorheological elastomer 221 and may be moved integrally with the housing 2221. The electromagnet 2223 may include a plurality of coils and cores. The same power supply as a power supply for applying a voltage to an electroadhesive module 230 or a power supply that operates independently from the power supply for applying the voltage to the electroadhesive module 230 may be connected to the electromagnet 2223. When the voltage is applied to the power supply connected to the electromagnet 2223, a magnetic field is generated by a current that flows through the plurality of coils of the electromagnet 2223. The magnetic field generated by the electromagnet 2223 together with the magnetic field generated by the permanent magnets 2222 of the magnet part 222 may affect the magnetorheological elastomer 221 according to a distance between the magnet part 222 and the magnetorheological elastomer 221. Thus, a larger magnetic field may be applied to the magnetorheological elastomer 221 due to the permanent magnets 2222 and the electromagnet 2223 of the magnet part 222 so that a change of rigidity of the magnetorheological elastomer 221 can be more greatly and rapidly controlled.

In the second embodiment of the present disclosure, the position of the electromagnet 2223 of the magnet part 222 is a side of a body 210 compared to the permanent magnets 2222. However, the position of the electromagnet 2223 is not limited to the description. That is, an electromagnet may also be installed at a side close to a magnetorheological elastomer compared to permanent magnets. Also, while a magnet part includes permanent magnets in the first embodiment and the magnet part includes permanent magnets and an electromagnet in the second embodiment, unlike in these embodiments, the magnet part may include only an electromagnet.

Meanwhile, the coils of the electromagnet 2223 may also have a shape and material of elasticity. In this case, the spring 2232 for connecting the magnet part 222 with the body 210 may be removed, and instead, the coils of the electromagnet 2223 may replace the function of the spring 2232.

Figure 6A:
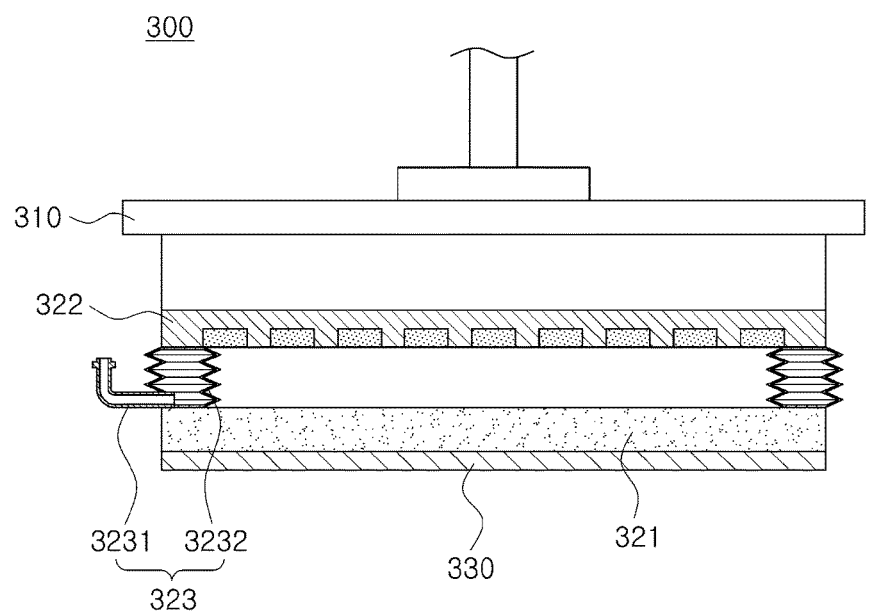
FIG. 6A is a cross-sectional view of an operating state of a shape compliant gripper according to a third embodiment of the present disclosure.
Figure 6B:
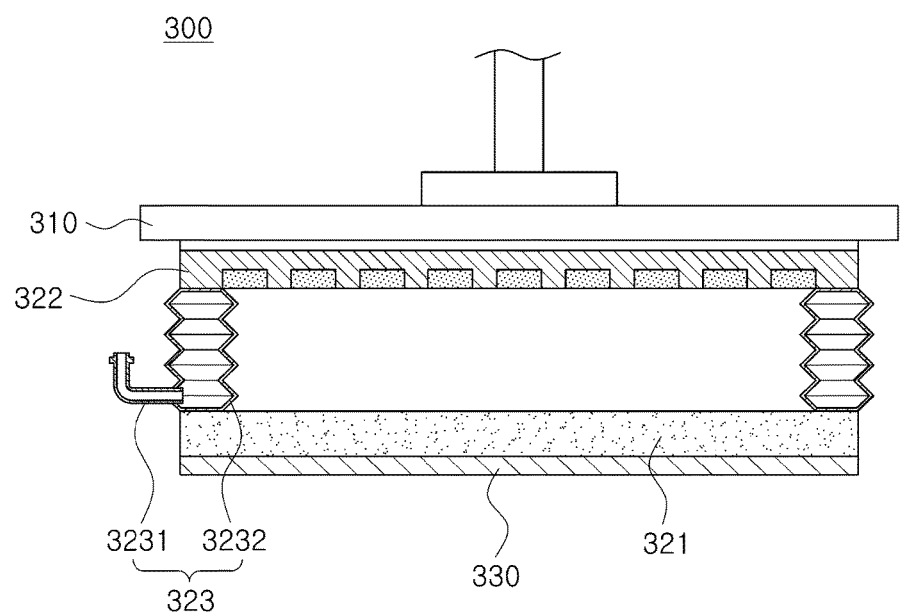
FIG. 6B is a cross-sectional view of an operating state of a shape compliant gripper according to a third embodiment of the present disclosure.

FIGS. 6A and 6B are cross-sectional views of a shape compliant gripper according to a third embodiment of the present disclosure. In the present embodiment, the configuration of a control part 323 is changed from the first embodiment of the present disclosure. In a shape compliant gripper 300 according to the present embodiment, the control part 323 includes bellows so as to adjust a distance between a magnetorheological elastomer 321 and a magnet part 322.

In detail, the control part 323 of the shape compliant gripper 300 according to the present embodiment includes bellows 3232 formed between the magnetorheological elastomer 321 and the magnet part 322, and the bellows 3232 are connected to an air pressure adjusting part (not shown) via a port 3231.

In the present embodiment, one end and the other end of the bellows 3232 are connected to the magnet part 322 and the magnetorheological elastomer 321, respectively, and the shape of the bellows 3232 may be contracted or may expand in a vertical direction between the magnetorheological elastomer 321 and a body 310 according to pressure inside the bellows 3232.

According to the third embodiment of the present disclosure, the bellows 3232 may be connected to the air pressure adjusting part via the port 3231, and the control part 323 may control the pressure inside the bellows 3232 by introducing the air into the bellows 3232 or discharging the air inside the bellows 3232 to the outside using the air pressure adjusting part so that the magnet part 322 can be moved to a desired position.

As illustrated in FIG. 6A, in a state in which the bellows 3232 are contracted, the magnet part 322 is located adjacent to the magnetorheological elastomer 321, and as illustrated in FIG. 6B, when the air is introduced into the bellows 3232 via the port 3231, the bellows 3232 expand and the magnet part 322 is moved to a position at which the magnet part 322 is spaced apart from the magnetorheological elastomer 321. On the contrary, when the air inside the bellows 3232 is discharged to the outside through the port 3231 in a state in which the bellows 3232 are expanded, the magnet part 322 returns to the position adjacent to the magnetorheological elastomer 321.

Through the above-described procedure, the shape compliant gripper 300 according to the present embodiment may adjust the intensity of a magnetic field applied to the magnetorheological elastomer 321, thereby controlling rigidity of the magnetorheological elastomer 321.

However, as illustrated in FIGS. 6A and 6B, the bellows do not need to be formed between the magnetorheological elastomer and the magnet part and may also be placed between the body and the magnet part. Also, like in the first embodiment, a spring may be disposed between the body and the magnet part so that the magnet part can be more rapidly spaced apart from the magnetorheological elastomer.

Figure 7A:
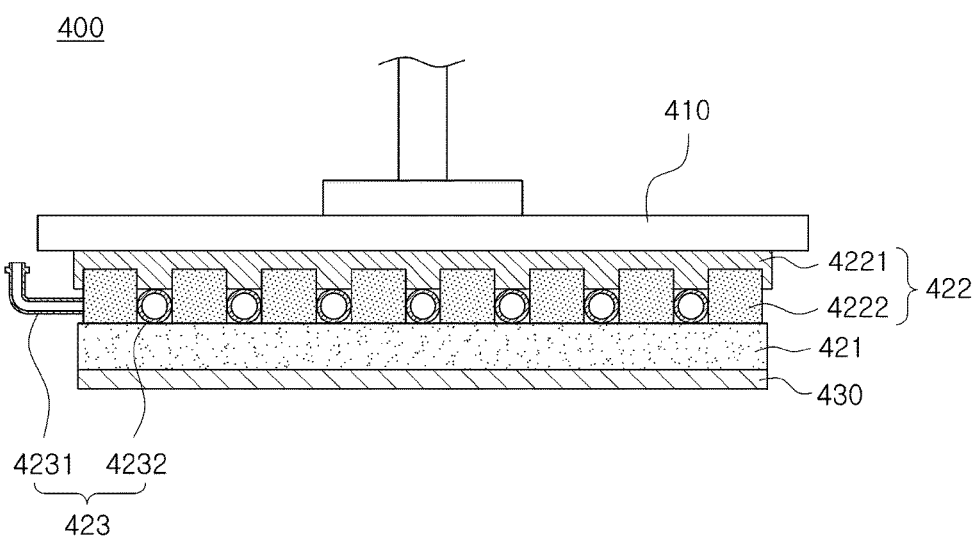
FIG. 7A is a cross-sectional view of an operating state of a shape compliant gripper according to a fourth embodiment of the present disclosure.
Figure 7B:
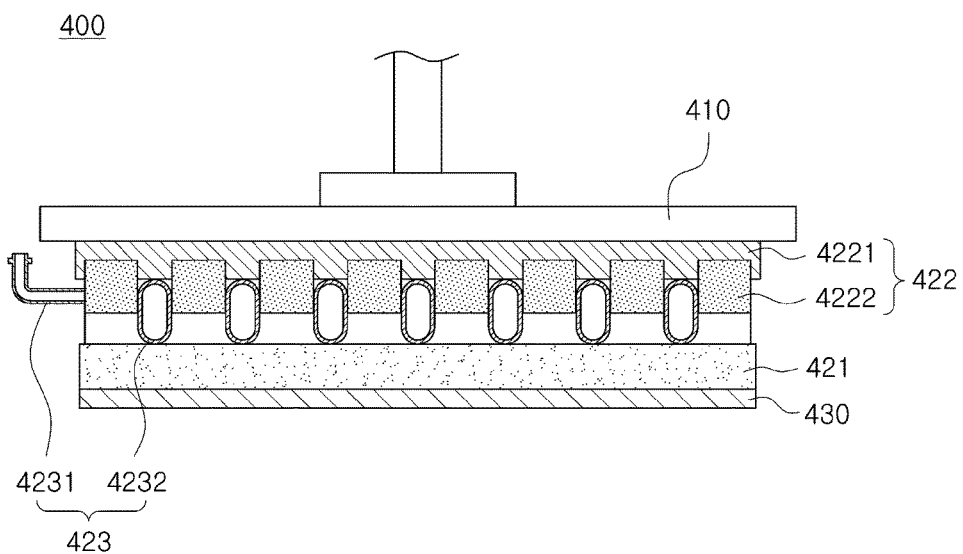
FIG. 7B is a cross-sectional view of an operating state of a shape compliant gripper according to a fourth embodiment of the present disclosure.

FIGS. 7A and 7B are cross-sectional views of a shape compliant gripper according to a fourth embodiment of the present disclosure.

A magnet part 422 of a shape compliant gripper 400 according to the fourth embodiment of the present disclosure may include a plurality of permanent magnets 4222, and the plurality of permanent magnets 4222 may be disposed on a housing 4221. In the present embodiment, the permanent magnets 4222 may be formed to have a shape of a rod that extends in a depth direction of the paper, i.e., a direction in which the permanent magnets 4222 penetrates through FIGS. 7A and 7B, and each of tubes 4232 may be disposed between the plurality of adjacent permanent magnets 4222.

According to the present embodiment, a control part 423 may control the volume of the tubes 4232 disposed between the plurality of permanent magnets 4222, thereby controlling a distance between a magnetorheological elastomer 421 and the magnet part 422. To this end, in the present embodiment, the tubes 4232 may be formed to have a shape of a tube that extends in a direction parallel to the plurality of permanent magnets 4222, i.e., in the depth direction of the paper. When the air is introduced into the tubes 4232 via a port 4231, the tubes 4232 expand in the vertical direction, i.e., a direction from the magnetorheological elastomer 421 to a body 410 so that the magnetorheological elastomer 421 and the magnet part 422 can be spaced apart from each other.

According to the present embodiment, one end of the port 4231 is connected to an end of the tube 4232 in the depth direction of the paper, and the other end of the port 4231 is connected to an air pressure adjusting part. Thus, the control part 423 may control the pressure inside the tube 4232 by introducing the air into the port 4231 connected to the tube 4232 or discharging the air inside the tube 4232 to the outside using the air pressure adjusting part.

As illustrated in FIG. 7A, before the air is introduced into the tube 4232, the magnet part 422 is disposed adjacent to the magnetorheological elastomer 421. Subsequently, when the air is introduced into the tube 4232 via the port 4231, as illustrated in FIG. 7B, the tube 4232 expands in the vertical direction, and the magnet part 422 and the magnetorheological elastomer 421 are spaced apart from each other. On the contrary, in a state in which the tube 4232 is expanded, when the air inside the tube 4232 is discharged via the port 4231, the magnet part 422 returns to the position adjacent to the magnetorheological elastomer 421. Through the above-described procedure, the shape compliant gripper 400 may adjust the intensity of the magnetic field applied to the magnetorheological elastomer 421, thereby controlling rigidity of the magnetorheological elastomer 421.

In the present embodiment, when a plurality of tubes 4232 are disposed between the plurality of permanent magnets 4222, the plurality of tubes 4232 may be connected to one port 4231 and simultaneously, air pressure control can be performed.

In the present embodiment, the tubes 4232 may be formed of silicone or other elastic materials.

Figure 8:
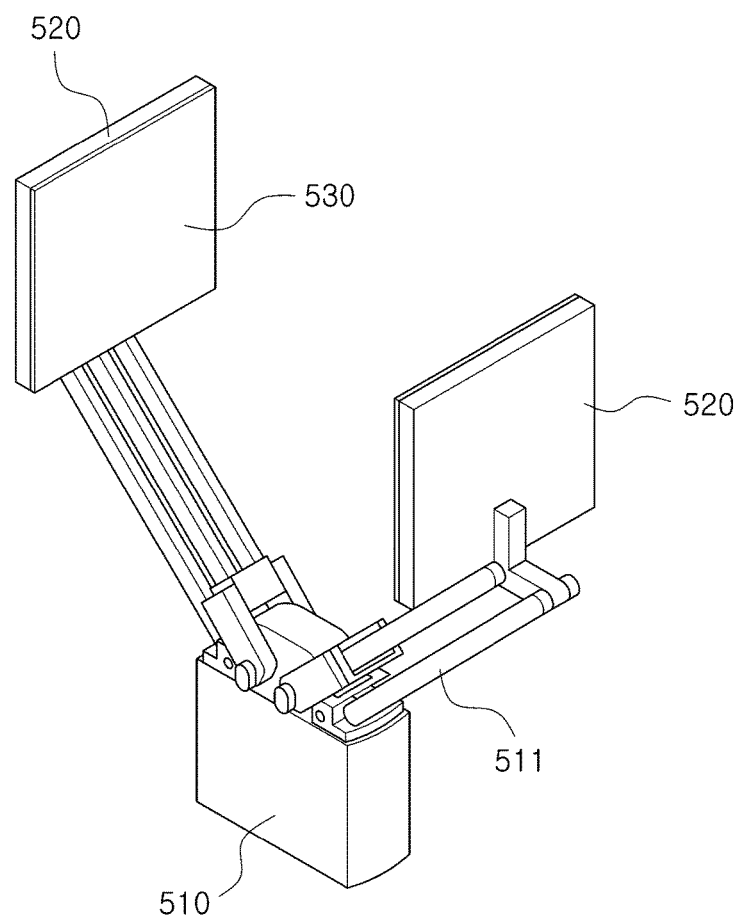
FIG. 8 is a diagram illustrating a shape compliant gripper according to a fifth embodiment of the present disclosure.

FIG. 8 is a perspective view of a shape compliant gripper according to a fifth embodiment of the present disclosure. A shape compliant gripper 500 according to the present embodiment includes two shape compliant modules 520 and two electroadhesive modules 530, and each of them is connected to one body 510 via a link 511.

Functions of elements of the shape compliant gripper 500 according to the fifth embodiment of the present disclosure are the same as those of the previous embodiments, and in particular, a driving method of the shape compliant module 520 is the same as that of the previous embodiments. However, the present embodiment is different from the previous embodiments in that two modules, such as two shape compliant modules 520 and two electroadhesive modules 530, can pick an object in cooperation in a similar manner to a manner for picking the object using fingers.

Therefore, the shape compliant gripper 500 according to the fifth embodiment of the present disclosure may use not only an electroadhesive force of the electroadhesive module 530 so as to pick the object but also a physical force held by the two shape compliant modules 520 and the two electroadhesive modules 530 at both sides, and in this procedure, the rigidity of the shape compliant module 520 is controlled so that the shape of the shape compliant gripper 500 is deformed conforming to the shape of the object and thus the shape compliant gripper 500 can be applied to an object having various shapes.

In the present embodiment, the two shape compliant modules 520 and the two electroadhesive modules 530 are used. However, the number of shape compliant modules 520 and the number of electroadhesive modules 530 may be modified in various ways. For example, the shape compliant gripper 500 may also be modified to have a shape of five fingers like human fingers, i.e., a set of shape compliant modules and electroadhesive modules.

As described above, in a shape compliant gripper according to an embodiment of the present disclosure, rigidity of a shape compliant module is variably controlled with a simple structure and an easy mechanism so that an atypical object having various shapes, sizes and materials can be picked.

As described above, particular matters such as detailed elements, and limited embodiments of the present disclosure have been described. However, these embodiments are provided to help more general understanding of the present disclosure, and the present disclosure is not limited thereto. Those skilled in the art to which the present disclosure pertains can promote various changes and modification from this description.

In particular, in the embodiments of the present disclosure, a shape compliant gripper includes an electroadhesive module in addition to a shape compliant module, thereby picking an object by adhering the object to the gripper using an electroadhesive force of the electroadhesive module. However, the shape compliant gripper may also pick the object using the shape compliant module without the use of the electroadhesive module. That is, when a magnetorheological elastomer of the shape compliant module is deformed like surrounding the outside of the object and then the shape of the shape compliant module is fixed, a mechanical force for picking the object is generated. Thus, the shape compliant gripper may also pick the object using the mechanical force. Alternatively, the shape compliant gripper may include an adhesive module of other type than electrical adhesion, for example, a vacuum adhesion type together with the shape compliant module, thereby picking the object using a combination thereof.

It will be apparent to those skilled in the art that various modifications can be made to the above-described exemplary embodiments of the present disclosure without departing from the spirit or scope of the invention. Thus, it is intended that the present disclosure covers all such modifications provided they come within the scope of the appended claims and their equivalents.

What is claimed is:

1. A shape compliant gripper for picking an atypical object, the shape compliant gripper comprising:
   a body; and
   a shape compliant module disposed on the body and having rigidity capable of being variably controlled,
   wherein the shape compliant module comprises a magnetorheological elastomer, a magnet part, and a control part for controlling a position of the magnet part with respect to the magnetorheological elastomer,
   wherein the control part controls a distance between the magnet part and the magnetorheological elastomer using an air pressure, and
   wherein the control part comprises at least one port connected to an inside of the shape compliant module and controls a distance between the magnet part and the magnetorheological elastomer by controlling pressure inside the shape compliant module through the at least one port.

2. The gripper of claim 1, wherein:
   the shape compliant module further comprises a spring disposed between the magnet part and the body, and
   when the magnet part returns to its original position in a state in which the magnet part is moved by the control part, a returning speed of the magnet part is improved due to elasticity of the spring.

3. The gripper of claim 1, wherein the magnet part comprises a housing and a plurality of permanent magnets placed within the housing.

4. The gripper of claim 3, wherein the plurality of permanent magnets are neodymium magnets.

5. The gripper of claim 3, wherein the magnet part further comprises a plurality of electromagnets disposed on one side of the housing.

6. The gripper of claim 1, further comprising an electroadhesive module disposed on the shape compliant module.

7. The gripper of claim 6, wherein the electroadhesive module comprises an insulator and a conductor disposed on the insulator and is capable of adhering to an external object due to an electrostatic force generated when a voltage is applied to the conductor.

8. A shape compliant gripper for picking an atypical object, the shape compliant gripper comprising:
   a body; and
   a shape compliant module disposed on the body and having rigidity capable of being variably controlled,
   wherein the shape compliant module comprises a magnetorheological elastomer, a magnet part, and a control part for controlling a position of the magnet part with respect to the magnetorheological elastomer,
   wherein the control part controls a distance between the magnet part and the magnetorheological elastomer using an air pressure, and
   wherein the control part comprises bellows formed between the magnetorheological elastomer and the magnet part and at least one port connected to an inside of the bellows and controls a distance between the magnet part and the magnetorheological elastomer by controlling pressure inside the bellows via the at least one port.

9. A shape compliant gripper for picking an atypical object, the shape compliant gripper comprising:
   a body; and
   a shape compliant module disposed on the body and having rigidity capable of being variably controlled,
   wherein the shape compliant module comprises a magnetorheological elastomer, a magnet part, and a control part for controlling a position of the magnet part with respect to the magnetorheological elastomer,
   wherein the control part controls a distance between the magnet part and the magnetorheological elastomer using an air pressure, and
   wherein:
   the magnet part comprises a plurality of permanent magnets, and
   the control part comprises at least one tube disposed between the plurality of adjacent permanent magnets and at least one port connected to an inside of the at least one tube and controls a distance between the magnet part and the magnetorheological elastomer by controlling pressure inside the tube through the at least one port.

* * * * *